(12) United States Patent
Ishikawa et al.

(10) Patent No.: US 12,188,832 B2
(45) Date of Patent: Jan. 7, 2025

(54) DECOLORIZING APPARATUS

(71) Applicant: TOSHIBA TEC KABUSHIKI KAISHA, Tokyo (JP)

(72) Inventors: Daisuke Ishikawa, Shizuoka (JP); Kazuki Taira, Tokyo (JP); Takaya Kitawaki, Shizuoka (JP); Daisuke Harayama, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 713 days.

(21) Appl. No.: 17/239,487

(22) Filed: Apr. 23, 2021

(65) Prior Publication Data

US 2022/0074796 A1 Mar. 10, 2022

(30) Foreign Application Priority Data

Sep. 7, 2020 (JP) ................................. 2020-149667

(51) Int. Cl.
*G02F 1/01* (2006.01)
*C09D 11/50* (2014.01)
*G01K 11/12* (2021.01)
*B43K 29/05* (2006.01)

(52) U.S. Cl.
CPC .............. *G01K 11/12* (2013.01); *C09D 11/50* (2013.01); *G02F 1/0147* (2013.01); *B43K 29/05* (2013.01)

(58) Field of Classification Search
CPC ........ G01K 13/02; G01K 13/00; G01K 11/20; G01K 11/125
See application file for complete search history.

(56) References Cited

U.S. PATENT DOCUMENTS

| 11,844,153 | B2 | 12/2023 | Mackmel |
| 2002/0136581 | A1 | 9/2002 | Arledge et al. |
| 2002/0158955 | A1 | 10/2002 | Hess et al. |
| 2009/0143516 | A1* | 6/2009 | MacDonald ........... G01K 11/12 524/236 |
| 2010/0247223 | A1* | 9/2010 | Ribi ........................ B41M 5/20 401/258 |
| 2012/0039355 | A1* | 2/2012 | Wolosuk ................ G01K 11/12 374/E11.018 |

(Continued)

FOREIGN PATENT DOCUMENTS

| CN | 105538970 A | 5/2016 |
| EP | 3 007 011 A1 | 4/2016 |

(Continued)

OTHER PUBLICATIONS

Notice of Allowance on U.S. Appl. No. 17/239,203 DTD Aug. 10, 2022.

(Continued)

*Primary Examiner* — Christopher Stanford
*Assistant Examiner* — Journey F Sumlar
(74) *Attorney, Agent, or Firm* — FOLEY & LARDNER LLP (57) ABSTRACT

A decolorizing apparatus includes a translucent heater, a casing, and a controller. The translucent heater is configured to generate heat according to an applied voltage. The casing is configured to support the translucent heater. The controller is configured to apply a voltage to the translucent heater. The voltage is associated with a temperature at which a thermochromic colorant.

17 Claims, 6 Drawing Sheets

(56) References Cited

U.S. PATENT DOCUMENTS

| | | | |
|---|---|---|---|
| 2012/0044278 A1 | 2/2012 | Hwang et al. | |
| 2012/0072157 A1* | 3/2012 | Alameh | G01K 13/00 374/1 |
| 2012/0128028 A1* | 5/2012 | van den Boom | H01J 37/26 374/159 |
| 2013/0271547 A1 | 10/2013 | Umetsu | |
| 2014/0150203 A1* | 6/2014 | Banzai | B43L 19/0025 15/424 |
| 2017/0001467 A1* | 1/2017 | Kim | B43L 19/0043 |
| 2017/0274699 A1 | 9/2017 | Schwendimann et al. | |
| 2020/0163533 A1 | 5/2020 | Kim et al. | |
| 2020/0309361 A1* | 10/2020 | Mourou | F21V 29/505 |

FOREIGN PATENT DOCUMENTS

| | | |
|---|---|---|
| EP | 3 112 182 A1 | 1/2017 |
| EP | 3 418 062 A1 | 12/2018 |
| EP | 3 620 305 A1 | 3/2020 |
| JP | H08-320463 A | 12/1996 |
| JP | 2005-014575 A | 1/2005 |
| JP | 3161302 U | 7/2010 |
| JP | 2012-035612 A | 2/2012 |
| JP | 2014-177053 A | 9/2014 |
| JP | 2015-101087 A | 6/2015 |
| JP | 2015-150889 A | 8/2015 |
| JP | 2017-513542 A | 6/2017 |
| JP | 2019-126917 A | 8/2019 |
| JP | 2020-523145 A | 8/2020 |

OTHER PUBLICATIONS

Extended European Search Report dated Nov. 22, 2021 issued in corresponding EP Application No. 21178291.7, 10 pages.

Extended European Search Report dated Nov. 22, 2021 issued in corresponding EP Application No. 21178322.0, 8 pages.

Notice of Reasons for Refusal dated Jan. 23, 2024 issued in JP Application No. 2020-149667, with English translation, 6 pages.

* cited by examiner

DECOLORIZING APPARATUS

CROSS-REFERENCE TO RELATED APPLICATION

This application is based upon and claims the benefit of priority from Japanese Patent Application No. 2020-149667, filed on Sep. 7, 2020, the entire contents of which are incorporated herein by reference.

FIELD

Embodiments described herein relate generally to a decolorizing apparatus.

BACKGROUND

A thermochromic colorant decolorizes by being heated to a predetermined decolorizing temperature or higher. For example, as a decolorizing apparatus, there is an apparatus that decolorizes the thermochromic colorant on a recording medium by heating the entire recording medium. However, the decolorizing apparatus that heats the entire recording medium cannot selectively decolor a part of the recording medium. As a decolorizing instrument, there is an instrument that decolorizes the thermochromic colorant on the recording medium with a dedicated member such as rubber provided at a rear end of a pen or an end of a cap for the pen. The dedicated member decolorizes the thermochromic colorant by frictional heat generated by rubbing on the recording medium. Since the dedicated member needs to be rubbed on the recording medium, the dedicated member is difficult to apply heat accurately and is not easy to perform a decolorizing operation while checking a position.

DETAILED DESCRIPTION

Embodiments described herein provide a decolorizing apparatus that allows a user to easily check a portion to be decolorized. In general, according to one embodiment, a decolorizing apparatus includes a casing, a translucent heater, a heating button, and a controller. The casing includes a power supply. The translucent heater is attached to the casing and includes a translucent film in which heat is generated by an applied voltage and a translucent substrate heated by the heat generated in the translucent film. The heating button instructs to heat the translucent substrate to a temperature at which a thermochromic colorant decolorizes. The controller applies a voltage from the power supply to the translucent film in a state where the heating button is pressed. As utilized herein, the term "translucent" describes an ability to permit passage of light, such as without appreciable scattering. As utilized herein, a "translucent" body is one through which light may pass. For example, light may pass through a "translucent" body without appreciable scattering so that bodies lying beyond the body are seen clearly. As utilized herein, the term "translucent" includes the term "transparent." Thus, a body that is described herein as being "translucent" may be "transparent."

Hereinafter, embodiments will be described with reference to the accompanying drawings.

A decolorizing apparatus according to first and second embodiments decolorizes a thermochromic colorant on a recording medium. In the first and second embodiments, as an example of the decolorizing apparatus, a decolorizing apparatus that decolorizes the thermochromic colorant on the recording medium will be described. In the first and second embodiments, decolorizing refers to changing color from a color that is visible to humans to a translucent color that is difficult for humans to see, by applying heat to the thermochromic colorant.

First Embodiment

First, a configuration of a decolorizing apparatus 1 as the decolorizing apparatus according to the first embodiment will be described.

Figure 1:
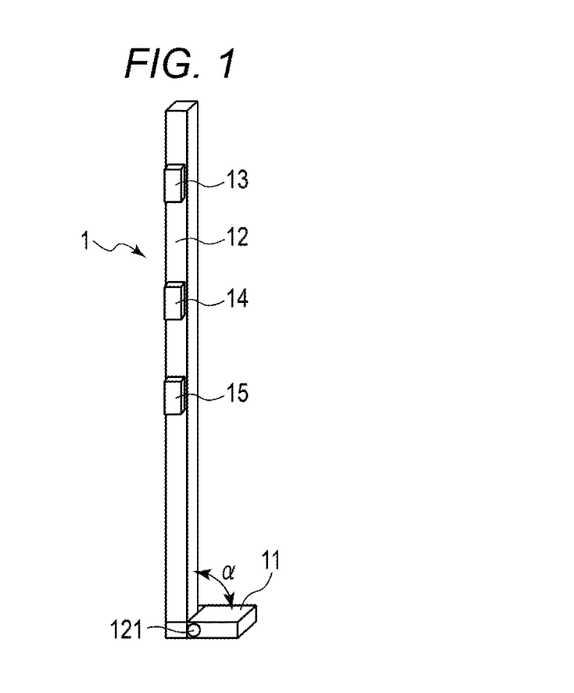
FIG. 1 is an external view illustrating a configuration example of a decolorizing apparatus as a decolorizing apparatus according to a first embodiment.
Figure 2:
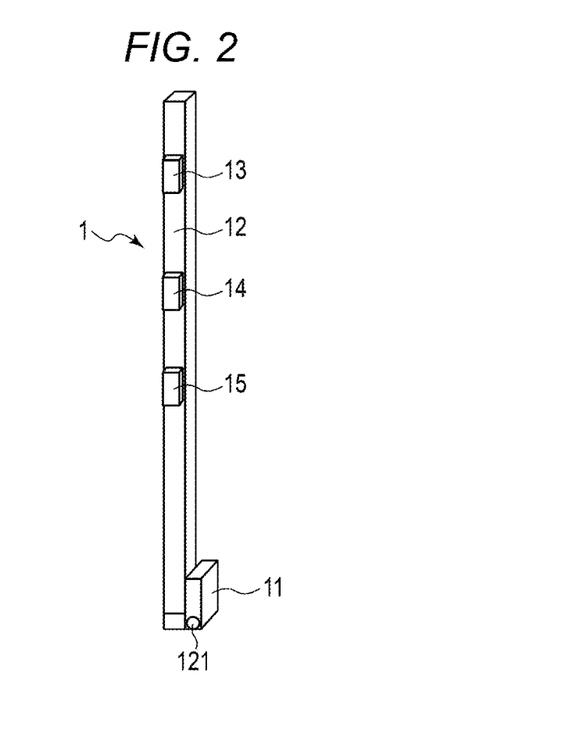
FIG. 2 is another external view illustrating the configuration example of the decolorizing apparatus.

FIGS. 1 and 2 are external views illustrating the configuration of the decolorizing apparatus 1 according to the first embodiment.

In the configuration examples illustrated in FIGS. 1 and 2, the decolorizing apparatus 1 includes a translucent heater 11 (heater), a support column 12 (support), a power button 13, a temperature switching button 14, a heating button 15, and the like.

The translucent heater 11 is a translucent device that decolorizes the thermochromic colorant. The translucent heater 11 may be a transparent device that decolorizes the thermochromic colorant. The translucent heater 11 is configured so that the top of the recording medium can be seen through when pressed against the recording medium. That is, the translucent heater 11 is configured so that the user can directly and visually recognize a portion thereof pressed against the recording medium for decolorizing the thermochromic colorant. For example, the translucent heater 11 includes a translucent substrate 21 (substrate) (see FIGS. 3 and 4) that is heated by heat from a heat source. The translucent substrate 21 of the translucent heater 11 reaches a temperature (decolorizing temperature) at which the thermochromic colorant is decolorized by heat from the heat source. The thermochromic colorant that is located in a region on the recording medium in contact with the translucent substrate 21 of the translucent heater 11 that reaches the decolorizing temperature is decolorized. The translucent substrate 21 may be a transparent substrate.

The support column 12 is a casing for attaching various parts such as the translucent heater 11, the power button 13, the temperature switching button 14, and the heating button 15. A controller 30 (see FIG. 5) and a battery 40 (see FIG. 5) are built in the support column 12. The support column 12 is a handle that can be gripped by the user. For example, the column 12 may be formed in a pen-like rod shape so that the user can easily grip the column 12. In the configuration example illustrated in FIG. 1, the support column 12 is formed in a rectangular prism shape having a long side of about 15 centimeters (cm). However, the shape of the support column 12 is not limited to the rectangular prism. The shape of the support column 12 may be any shape so long as the user can grip the support column 12.

The support column 12 is provided with a support mechanism 121 (support) that supports the translucent heater 11. The support mechanism 121 supports the translucent heater 11 to be movable between a decolorizing position (decolorizing position) and an accommodating position. FIG. 1 illustrates an example of the decolorizing position of the translucent heater 11. FIG. 2 illustrates an example of the accommodating position of the translucent heater 11. In the configuration examples illustrated in FIGS. 1 and 2, the translucent heater 11 rotates with respect to the support column 12 around a fulcrum of the support mechanism 121 as illustrated by an arrow a in FIG. 1. The support mechanism 121 includes a lock mechanism that locks the translucent heater 11 at the decolorizing position or the accommodating position. The lock mechanism may be any lock mechanism so long as the lock mechanism can be locked or unlocked by user operation. In the unlocked state, the translucent heater 11 can rotate around the fulcrum of the support mechanism 121.

The support mechanism 121 may be any mechanism so long as the mechanism can hold the translucent heater 11 at the decolorizing position and the accommodating position. For example, the support mechanism 121 may be a mechanism that slides the translucent heater 11 to be accommodated in the accommodating position in the support column 12. The support mechanism 121 may be a mechanism capable of removing the translucent heater 11.

The translucent heater 11 is configured so that the surface of the translucent substrate 21 comes into contact with the recording medium in a state of being held in the decolorizing position. In the example illustrated in FIG. 1, the translucent heater 11 is held at a position (decolorizing position) where the surface (decolorizing surface) of the translucent substrate 21 is perpendicular to the long side of the support column 12. For example, the translucent heater 11 locked at the decolorizing position decolorizes the thermochromic colorant that is located in a region with which the surface of the translucent substrate 21 heated to the decolorizing temperature comes into contact.

In the example illustrated in FIG. 2, the translucent heater 11 is held at a position (accommodating position) where the surface (decolorizing surface) of the translucent substrate 21 is parallel to the long side of the support column 12. For example, when the user moves the translucent heater 11 in the decolorizing position so as to be folded toward the support column 12, the translucent heater 11 rotates around the fulcrum of the support mechanism 121 and is held in the accommodating position. By holding the translucent heater 11 in the accommodating position, the translucent heater 11 can be prevented from becoming bulky, and the decolorizing apparatus 1 can be easily carried around with a case.

The decolorizing apparatus 1 is configured so that power can be supplied to the translucent heater 11 located at the decolorizing position and power cannot be supplied to the translucent heater 11 located at the accommodating position. That is, the translucent heater 11 is electrically connected to the controller 30 (see FIG. 5) or the like located in the support column 12, at the decolorizing position as illustrated in FIG. 1. At the accommodating position as illustrated in FIG. 2, the electrical connection of the translucent heater 11 with the controller 30 (see FIG. 5) or the like located in the support column 12 is disconnected. With this configuration, in the decolorizing apparatus 1, power is not supplied to the translucent heater 11 located at the accommodating position, and the decolorizing apparatus 1 can be safely carried and stored.

The power button 13, the temperature switching button 14, and the heating button 15 are disposed side by side on the surface of the support column 12. The buttons 13 to 15 may be provided anywhere so long as the buttons 13 to 15 can be operated by the user.

The power button 13 is a button for switching ON and OFF of the power. For example, the decolorizing apparatus 1 switches ON and OFF of the power according to the state of the power button 13. For example, each time the power button 13 is pressed, the decolorizing apparatus 1 switches ON and OFF of the power. The decolorizing apparatus 1 may switch ON and OFF of the power when the power button 13 is pressed for a predetermined time or longer. The power button 13 may include a mechanism for holding a pressed-in state. In this case, the decolorizing apparatus 1 may be powered ON when the power button 13 is pressed in and powered OFF when the power button 13 is not pressed in.

The temperature switching button 14 is a button for designating the temperature of the decolorizing surface in the translucent heater 11. For example, the temperature setting of the translucent heater 11 is designated according to the state of the temperature switching button. When the temperature switching button 14 is pressed in, the translucent heater 11 is set to a first temperature. When the temperature switching button is not pressed in, the translucent heater 11 is set to a second temperature.

The heating button 15 is a button for switching ON and OFF of the translucent heater 11. For example, the translucent heater 11 is turned ON to heat the translucent substrate 21 to a set temperature while the heating button 15 is pressed. When the heating button 15 is not pressed, the translucent heater 11 is turned OFF. The heating button 15 may include a mechanism for holding the heating button 15 in a pressed-in state.

Next, a configuration example of the translucent heater 11 included in the decolorizing apparatus 1 according to the first embodiment will be described.

Figure 3:
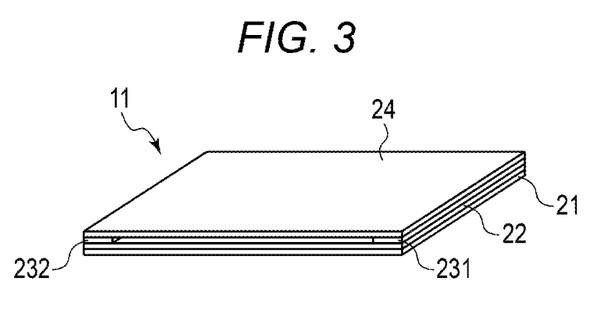
FIG. 3 is a diagram illustrating a structure of a translucent heater.
Figure 4:
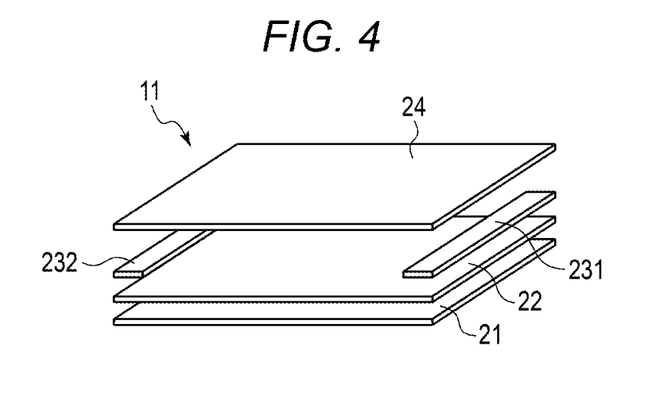
FIG. 4 is a diagram illustrating an example of parts configuring the translucent heater.

FIG. 3 is a diagram illustrating a configuration example of the translucent heater 11 included in the decolorizing apparatus 1 according to the first embodiment. FIG. 4 is a diagram illustrating parts configuring the translucent heater 11 illustrated in FIG. 3.

As illustrated in FIGS. 3 and 4, the translucent heater 11 includes the translucent substrate 21, a translucent film 22 (film), electrodes 23 (first electrode 231 and second electrode 232), and an insulating layer (insulating film) 24. The translucent substrate 21 is a translucent substrate such as a glass substrate or a polyethylene terephthalate (PET) film. The translucent film 22 is a translucent film having conductivity such as an indium tin oxide (ITO) film. The translucent film 22 may be transparent. The translucent film 22 has electrical resistance (sheet resistance). For example, the translucent film 22 is formed on the translucent substrate 21 by vapor deposition or the like.

The electrodes 23 include the first electrode 231 and the second electrode 232. The electrodes 23 are connected to the translucent film 22. The translucent insulating layer 24 such as a glass cover is formed on the translucent film 22 to which the electrodes 23 are connected. The translucent insulating layer 24 may be transparent. The electrodes 23 may be formed of a plurality of pairs. For example, a plurality of second electrodes 232 may be provided for one first electrode.

Figure 5:
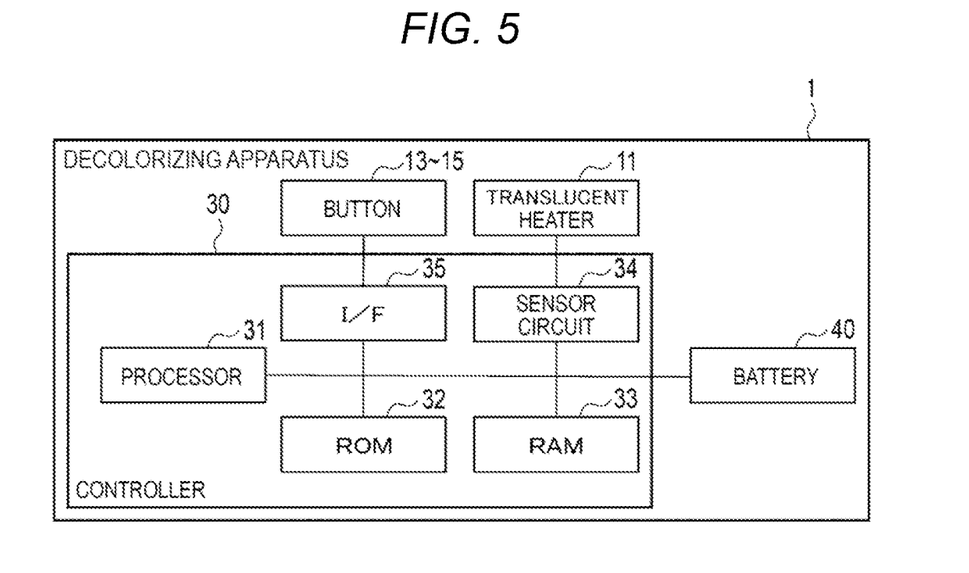
FIG. 5 is a block diagram illustrating a configuration example of a control system.

The first electrode 231 and the second electrode 232 are connected to a sensor circuit 34 (see FIG. 5). For example, the first electrode 231 is grounded. An electric potential is applied to the second electrode 232 from the sensor circuit 34. A current flows through the conductive translucent film 22 due to the electric potential difference between the first electrode 231 and the second electrode 232.

When a current flows between the first electrode 231 and the second electrode 232, Joule heat is generated in the translucent film 22 between the first electrode 231 and the second electrode 232 due to sheet resistance. The Joule heat generated in the translucent film 22 heats the translucent substrate 21. Far infrared rays are radiated from the surface of the translucent substrate 21. The heated translucent substrate 21 heats an object in contact with the surface thereof.

Next, a configuration of a control system in the decolorizing apparatus 1 according to the first embodiment will be described.

FIG. 5 is a block diagram illustrating a configuration example of the control system in the decolorizing apparatus 1.

As illustrated in FIG. 5, the decolorizing apparatus 1 includes the translucent heater 11, the controller 30, and the battery 40. The controller 30 and the battery 40 are built in the support column 12 as a casing. The controller 30 is connected to the translucent heater 11, the power button 13, the temperature switching button 14, and the heating button 15.

The controller 30 controls the driving of the translucent heater 11 according to states of the power button 13, the temperature switching button 14, and the heating button 15. The battery 40 provides energy for heating the heat source of the translucent heater 11. The battery 40 is a rechargeable secondary battery built in the support column 12. The support column 12 may be provided with a battery box to and from which a battery as the battery 40 can be attached and detached.

The controller 30 includes a processor 31, a read-only memory (ROM) 32, a random access memory (RAM) 33, the sensor circuit 34, and an interface (I/F) 35. The translucent heater 11 and the battery 40 are connected to the controller 30. The controller 30 is operated by the power supplied from the battery 40.

The processor 31 is connected to the ROM 32, the RAM 33, the sensor circuit 34, and the interface 35 via a bus in the controller 30. The processor 31 performs control of each part and the like. The processor 31 is, for example, a central processing unit (CPU). The processor 31 executes a program for controlling each part. The ROM 32 is a non-volatile memory for storing a program. The RAM 33 is a working memory that temporarily stores data.

The sensor circuit 34 includes a circuit for driving the translucent heater 11. The sensor circuit 34 controls the driving of the translucent heater 11 according to a control signal from the processor 31.

The interface 35 connects the buttons 13 to 15. The processor 31 acquires a signal indicating the state of each of the buttons 13 to 15 via the interface 35.

The controller 30 may include an interface for receiving a signal from an external device. The battery 40 may be provided with an interface for acquiring power for charging from an external power supply.

Next, a relationship between a voltage applied to the translucent heater 11 and a temperature generated on the surface of the translucent substrate 21 of the translucent heater 11 will be described.

Figure 6:
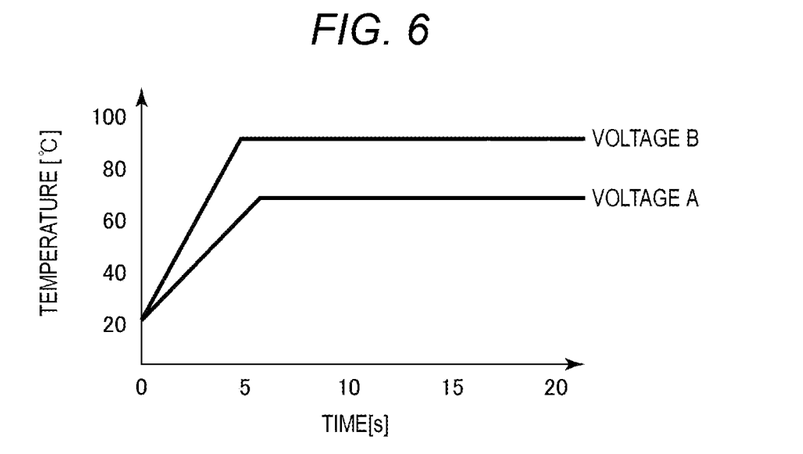
FIG. 6 is a diagram illustrating an example of a temperature change when a voltage is applied to the translucent heater.

FIG. 6 is a diagram illustrating the relationship between the temperature generated when two types of voltages are applied to the electrodes 23 (231 and 232) of the translucent heater 11, and the time.

FIG. 6 illustrates a temperature change when a voltage A is applied to the electrodes 231 and 232 of the translucent heater 11 and a temperature change when a voltage B larger than the voltage A is applied to the electrodes 231 and 232. As illustrated in FIG. 6, when a voltage is applied to the electrodes 231 and 232 of the translucent heater 11, Joule heat is generated in the translucent film 22, and the temperature of the translucent substrate 21 rises due to the heat generated by the translucent film 22. The temperature of the translucent substrate 21 reaches a predetermined temperature several seconds after the voltage is applied. In the example illustrated in FIG. 6, when the voltage A is applied, the temperature of the translucent substrate 21 becomes about 70° C. after six to seven seconds. When the voltage B is applied, the temperature of the translucent substrate 21 becomes about 90° C. after five to six seconds.

In the decolorizing apparatus 1 according to the first embodiment, it is assumed that two types of temperatures can be set as the temperature of the translucent substrate 21. The processor 31 of the controller 30 sets the temperature of the translucent substrate 21 according to the state of the temperature switching button 14. As illustrated in FIG. 6, the temperature of the translucent substrate 21 is determined by a voltage value to be applied to the electrode 23 of the translucent heater 11. For that reason, the processor 31 of the controller 30 sets the voltage value to be applied to the translucent heater 11 by the sensor circuit 34 according to the state of the temperature switching button 14.

For example, the temperature set by the temperature switching button 14 is switched according to the object to be decolorized. Some thermochromic colorants have different decolorizing temperatures for decolorizing (discoloring). As a specific example, it is assumed that a first colorant is decolorized at a temperature equal to or higher than a first decolorizing temperature and a second colorant is decolorized at a second decolorizing temperature higher than the first decolorizing temperature. In this case, at the temperature equal to or higher than the first decolorizing temperature and lower than the second decolorizing temperature, the second colorant is not decolorized but the first colorant is decolorized. At a temperature higher than the second decolorizing temperature, both the second colorant and the first colorant are decolorized. The user can designate either a setting for decolorizing the first colorant without decolorizing the second colorant or a setting for decolorizing both the first colorant and the second colorant with the temperature switching button 14.

The thermochromic colorant on the recording medium is decolorized by the heat applied to the recording medium from the surface of the translucent substrate 21. For that reason, the user may switch the setting of temperature with the temperature switching button 14 according to the use situation. For example, when the user wants to quickly move the translucent heater 11 to decolor the thermochromic colorant on the recording medium, the user may set the temperature higher with the temperature switching button 14. When the user does not want to give the recording medium as high a temperature as possible, the user may set the temperature lower with the temperature switching button 14 to slowly move the translucent heater 11.

Next, the operation of the decolorizing apparatus 1 according to the first embodiment will be described.

Figure 7:
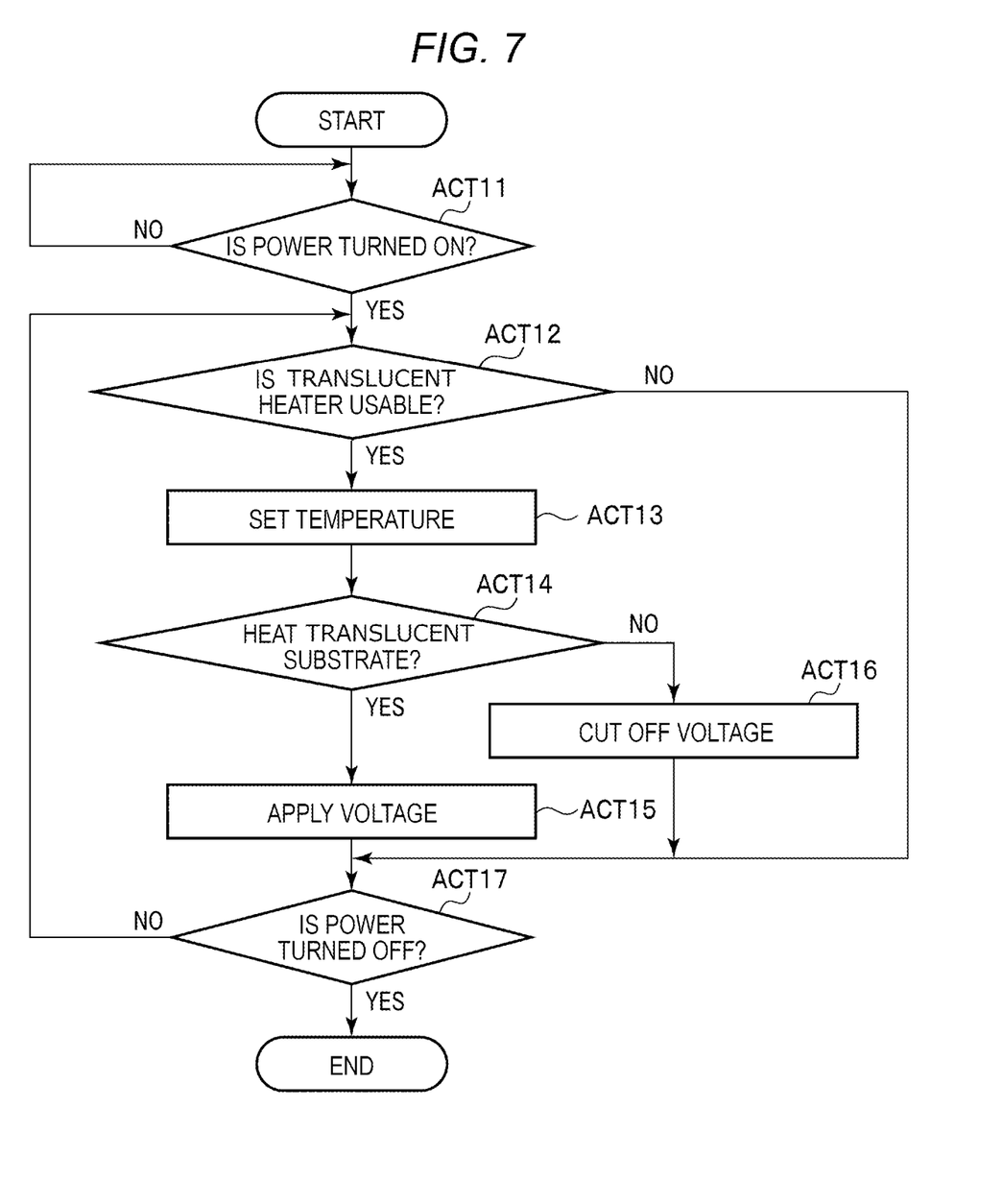
FIG. 7 is a flowchart for describing an operation example of the decolorizing apparatus according to the first embodiment.

FIG. 7 is a flowchart for describing an operation example of the decolorizing apparatus 1 according to the first embodiment.

The processor 31 of the controller 30 detects the state of the power button 13. For example, when the power button 13 is pressed in a state where the power is in an OFF state, the processor 31 turns ON the power according to the signal supplied from the power button 13. When the power button 13 is not pressed (NO in ACT11), the processor 31 keeps the OFF state of power.

When the processor 31 receives a signal indicating that the power button 13 is pressed in a state where the power is in an ON state (YES in ACT11), the processor 31 determines whether the translucent heater 11 is in a usable state (ACT12). For example, when the translucent heater 11 is located at the decolorizing position as illustrated in FIG. 1, the processor 31 determines that the translucent heater 11 is in the usable state. When the translucent heater 11 is located at the accommodating position as illustrated in FIG. 2, the processor 31 determines that the translucent heater 11 is in an unusable state. The processor 31 may determine whether or not the translucent heater 11 is in the usable state depending on whether or not the translucent heater 11 is electrically connected to the controller 30.

When it is determined that the translucent heater 11 is in the unusable state (NO in ACT12), the processor 31 waits for the translucent heater 11 to be in the usable state. The decolorizing apparatus 1 may be provided with an indicator, such as a light emitting diode (LED) for notifying whether the translucent heater 11 is in the usable state or the unusable state, on the support column 12. When it is determined that the translucent heater 11 is in an unusable state, the processor 31 may cause the indicator to display that the translucent heater 11 is in an unusable state.

When it is determined that the translucent heater 11 is in the usable state (YES in ACT12), the processor 31 sets the temperature of the translucent substrate 21 according to the state of the temperature switching button 14 (ACT13). For example, the processor 31 detects the state of the temperature switching button 14. When the temperature switching button 14 is in the state of designating the first temperature, the processor 31 sets a voltage value corresponding to the first temperature in the sensor circuit 34 as a voltage value to be applied to the translucent heater 11. When the temperature switching button 14 is in the state of designating the second temperature, the processor 31 sets a voltage value corresponding to the second temperature in the sensor circuit 34 as the voltage value to be applied to the translucent heater 11.

After setting the temperature according to the state of the temperature switching button 14, the processor 31 determines whether or not to heat the translucent substrate 21 of the translucent heater 11 (ACT14). For example, the processor 31 determines to heat the translucent substrate 21 if the heating button 15 is in a state of being pressed, and determines not to heat the translucent substrate 21 if the heating button 15 is in a state of not being pressed. In this case, the processor 31 detects the state of the heating button 15 and determines whether or not to heat the translucent substrate 21 according to the state of the heating button 15.

When it is determined to heat the translucent substrate 21 (YES in ACT14), the processor 31 applies a voltage of a value set according to the state of the temperature switching button 14 to the electrodes 23 of the translucent heater 11 (ACT15). For example, the processor 31 causes a voltage to be applied to the electrodes 231 and 232 from the sensor circuit 34 in which the voltage value to be applied is set according to the state of the temperature switching button 14.

When it is determined not to heat the translucent substrate 21 (NO in ACT14), the processor 31 cuts off the voltage to be applied to the electrodes 23 of the translucent heater 11 (ACT16). For example, the processor 31 stops the application of the voltage from the sensor circuit 34 to the electrodes 23 of the translucent heater 11.

The processor 31 always detects the state of the power button 13 after the power is turned ON. The processor 31 repeatedly executes the processing of ACT12, ACT13, and ACT14, and either ACT15 or ACT16, until the power button 13 is turned to the OFF state (NO in ACT17). Further, when the power button 13 is turned to the OFF state (YES in ACT17), the processor 31 ends the processing of series of actions.

As described above, the decolorizing apparatus according to the first embodiment includes the translucent heater composed of a translucent member such that the pressed portion can be seen through and the controller. The translucent heater includes the translucent substrate and the conductive translucent film. The controller applies a voltage of a voltage value, which corresponds to the set temperature, to the translucent film of the translucent heater. In the translucent heater, the translucent substrate is heated by heat generated in the translucent film by the applied voltage. On the heated translucent substrate, the thermochromic colorant formed on the recording medium can be decolorized.

According to the decolorizing apparatus according to the first embodiment as described above, since the translucent heater is translucent, the user can directly and visually recognize the portion pressed for decolorizing. That is, the decolorizing apparatus according to the first embodiment can be operated by the user while directly checking the portion pressed for decolorizing. As a result, a decolorizing apparatus capable of reliably pressing the decolorizing surface against a portion desired to decolor and decolorizing the thermochromic colorant on the recording medium accurately can be provided.

Second Embodiment

Next, a second embodiment will be described.

Figure 8:
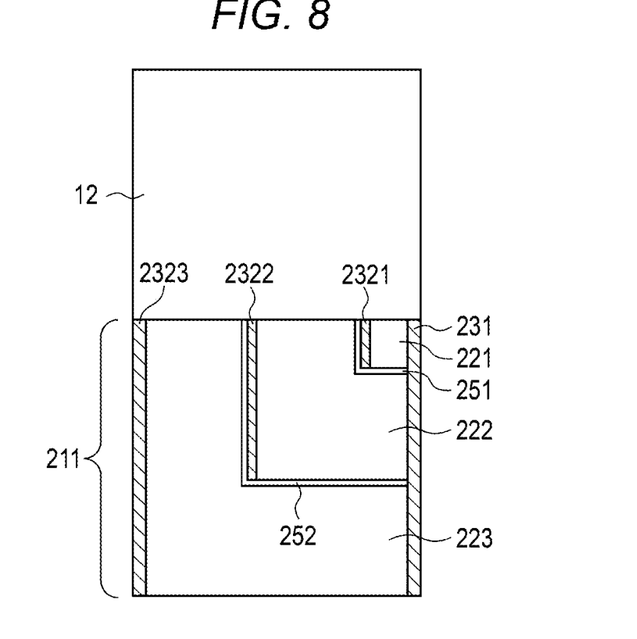
FIG. 8 is an external view schematically illustrating a configuration example of a decolorizing apparatus as a decolorizing apparatus according to a second embodiment.

FIG. 8 is a diagram illustrating a first configuration example of a translucent heater 211 used in a decolorizing apparatus according to a second embodiment.

Similar to the structure of the translucent heater 11 illustrated in FIG. 3, the translucent heater 211 according to the second embodiment has a structure in which a translucent substrate, a translucent film, electrodes, and an insulating layer are stacked. However, the translucent heater 211 is different from the translucent heater 11 illustrated in FIG. 3 in the configurations of the translucent film and the electrodes.

In the configuration example illustrated in FIG. 8, the translucent heater 211 is formed with three different-shaped translucent films 221, 222, and 223, which serve as heat sources. The three translucent films 221, 222, and 223 are disposed on the translucent substrate 21 similar to that of the translucent heater 11 illustrated in FIG. 3. The translucent film 221 is disposed in a first region on the translucent substrate 21. The translucent film 222 is disposed on the translucent substrate 21 in accordance with the translucent film 221. The translucent film 221 and the translucent film 222 are disposed in a second region on the translucent substrate 21. The translucent film 223 is disposed on the translucent substrate 21 in accordance with the translucent films 221 and 222. The translucent film 221, the translucent film 222, and the translucent film 223 are disposed so as to cover the entire decolorizing surface on the translucent substrate 21.

Each of the translucent films 221, 222, and 223 is covered with the translucent insulating layer 24 in a state of being connected to a pair of electrodes. The translucent film 221 is connected to an electrode 231 and an electrode 2321. The translucent film 222 is connected to the electrode 231 and an electrode 2322. The translucent film 223 is connected to the electrode 231 and an electrode 2323.

The electrodes 231, 2321, 2322, and 2323 connected to the translucent films 221, 222, and 223 are connected to the controller 30 built in the support column 12. The controller 30 has the same configuration as that of the decolorizing apparatus las illustrated in FIG. 5. The electrodes 231, 2321, 2322, and 2323 are connected to the sensor circuit 34 in the controller 30. Here, the electrode 231 is grounded.

The translucent film 221 is connected to the electrode 231 and the electrode 2321. When an electric potential is applied to the electrode 2321 (when a voltage is applied to the electrode 231 and the electrode 2321), a current flows through the translucent film 221, and heat due to sheet resistance is generated in the translucent film 221. The sensor circuit 34 of the controller 30 heats the translucent film 221 by applying a voltage to the electrode 231 and the electrode 2321 (applying a voltage to the translucent film 221). Therefore, when the sensor circuit 34 applies a voltage to the translucent film 221, the region (first region) in the translucent substrate 21 corresponding to the translucent film 221 is heated by heat from the translucent film 221. The first region of the translucent substrate 21 becomes a region where the thermochromic colorant can be decolorized when the decolorizing temperature is reached by the heat from the translucent film 221.

The translucent film 222 is connected to the electrode 231 and the electrode 2322. When an electric potential is applied to the electrode 2322 (when a voltage is applied to the electrode 231 and the electrode 2322), a current flows through the translucent film 222, and heat due to sheet resistance is generated in the translucent film 222. The sensor circuit 34 heats the translucent film 222 by applying a voltage to the electrode 231 and the electrode 2322 (applying a voltage to the translucent film 222).

The translucent film 222 and the translucent film 221 form a rectangular region (second region) larger than the translucent film 221. Therefore, when the sensor circuit 34 applies a voltage to the translucent film 222 and the translucent film 221, the second region in the translucent substrate 21 corresponding to the translucent film 221 and the translucent film 222 is heated. The second region of the translucent substrate 21 becomes a region where the thermochromic colorant can be decolorized when the decolorizing temperature is reached by the heat from the translucent film 221 and the translucent film 222.

The translucent film 223 is connected to the electrode 231 and the electrode 2323. When an electric potential is applied to the electrode 2323 (when a voltage is applied to the electrode 231 and the electrode 2323), a current flows through the translucent film 223, and heat due to sheet resistance is generated in the translucent film 223. The sensor circuit 34 heats the translucent film 223 by applying a voltage to the electrode 231 and the electrode 2323 (applying a voltage to the translucent film 223).

The translucent film 223, the translucent film 222, and the translucent film 221 form a rectangular region that covers the entire decolorizing surface of the translucent substrate 21. Therefore, when the sensor circuit 34 applies a voltage to the translucent film 223, the translucent film 222, and the translucent film 221, the entire decolorizing surface (third region) of the translucent substrate 21 is heated. The third region of the translucent substrate 21 becomes a region where the thermochromic colorant can be decolorized when the decolorizing temperature is reached by the heat from the translucent film 221, the translucent film 222, and the translucent film 223.

On the translucent heater 211, a mark 251 indicating the region (first region) corresponding to the translucent film 221 and a mark 252 indicating the region (second region) corresponding to the translucent film 221, and the translucent film 222 are displayed. The marks 251 and 252 may be marked in any manner long as a region to be heated (decolorable region) can be checked by the user. For example, the marks 251 and 252 may be printed on the translucent substrate 21 or may be printed on the insulating layer 24.

Figure 9:
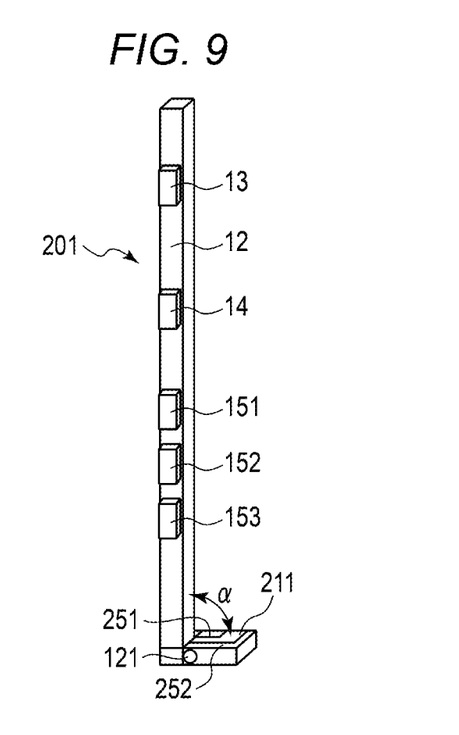
FIG. 9 is a diagram illustrating a first configuration example of a translucent heater.

FIG. 9 is an external view illustrating a configuration example of a decolorizing apparatus 201 according to the second embodiment.

The decolorizing apparatus 201 illustrated in FIG. 9 is different from the decolorizing apparatus 1 in that the translucent heater 11 in the decolorizing apparatus 1 illustrated in FIG. 1 is replaced with the translucent heater 211 illustrated in FIG. 8. The decolorizing apparatus 201 illustrated in FIG. 9 is also different from the decolorizing apparatus 1 in that the heating button 15 in the decolorizing apparatus 1 illustrated in FIG. 1 is replaced with three heating buttons 151, 152, and 153. Regarding the same configuration as the decolorizing apparatus 1 illustrated in FIG. 1 in the decolorizing apparatus 201 illustrated in FIG. 9, the same reference numerals are given to the same portions and the detailed descriptions thereof will be omitted.

Similar to the translucent heater 11 of the decolorizing apparatus 1 illustrated in FIGS. 1 and 2, the translucent heater 211 is supported on the support column 12 by the support mechanism 121. The translucent heater 211 is configured to move between the decolorizing position and the accommodating position by rotating with respect to the support column 12 around the fulcrum of the support mechanism 121. The translucent heater 211 decolorizes the thermochromic colorant on the recording medium in a state of being locked at the decolorizing position as illustrated in FIG. 9. Similar to the translucent heater 11, the translucent heater 211 is held on the support column 12 in a state of being electrically disconnected from the controller 30 at the accommodating position.

As described above, the translucent heater 211 illustrated in FIG. 9 heats any of the first region (a region corresponding to the translucent film 221), the second region (a region corresponding to the translucent film 221 and the translucent film 222), or the third region (a region corresponding to the translucent films 221, 222, and 223). The mark 251 indicating the first region and the mark 252 indicating the second region are formed on the translucent heater 211.

Three heating buttons 151, 152, and 153 are buttons for selecting a region to be heated to the decolorizing temperature.

The heating button 151 is a button for instructing that the first region is to be heated to the decolorizing temperature. When the heating button 151 is pressed, in the translucent heater 211, the first region of the translucent substrate 21 is heated to become a decolorable region.

The heating button 152 is a button for instructing that the second region is to be heated to the decolorizing temperature. When the heating button 152 is pressed, in the translucent heater 211, the second region of the translucent substrate 21 is heated to become a decolorable region.

The heating button 153 is a button for instructing that the third region (entire decolorizing surface of the translucent substrate 21) is to be heated to the decolorizing temperature. When the heating button 153 is pressed, the third region of the translucent substrate 21 is heated to become a decolorable region.

The decolorizing apparatus 201 illustrated in FIG. 9 operates in the same flow as the flowchart illustrated in FIG. 7 described in the first embodiment. However, the decolorizing apparatus 201 is different from the decolorizing apparatus 1 in that the region corresponding to the pressed heating button among the three heating buttons 151, 152, and 153 is heated. In the decolorizing apparatus 201, the processor 31 of the controller 30 detects the states of the heating buttons 151, 152, and 153. The processor 31 controls the sensor circuit 34 to heat the region corresponding to the pressed heating button.

For example, when the heating button 151 is pressed, the processor 31 of the controller 30 applies a voltage, which corresponds to the decolorizing temperature set, to the translucent film 221 by the sensor circuit 34. When the voltage is applied to the translucent film 221, the first region of the translucent substrate 21 is heated by heat from the translucent film 221. The first region of the translucent substrate 21 becomes a decolorable region when the decolorizing temperature is reached by the heat from the translucent film 221.

When the heating button 152 is pressed, the processor 31 of the controller 30 applies a voltage, which corresponds to the set temperature, to the translucent films 221 and 222 by the sensor circuit 34. When the voltage is applied to the translucent films 221 and 222, the second region of the translucent substrate 21 is heated. The second region of the translucent substrate 21 becomes a decolorable region when the decolorizing temperature is reached by the heat from the translucent films 221 and 222.

When the heating button 153 is pressed, the processor 31 of the controller 30 applies a voltage, which corresponds to the set temperature, to the translucent films 221, 222, and 223 by the sensor circuit 34. When the voltage is applied to the translucent films 221, 222, and 223, the third region of the translucent substrate 21 is heated. The third region (entire decolorizing surface) of the translucent substrate 21 becomes a decolorable region when the decolorizing temperature is reached by the heat from the translucent films 221, 222, and 223.

Next, a second configuration example of the translucent heater mounted on the decolorizing apparatus 201 according to the second embodiment will be described.

Figure 10:
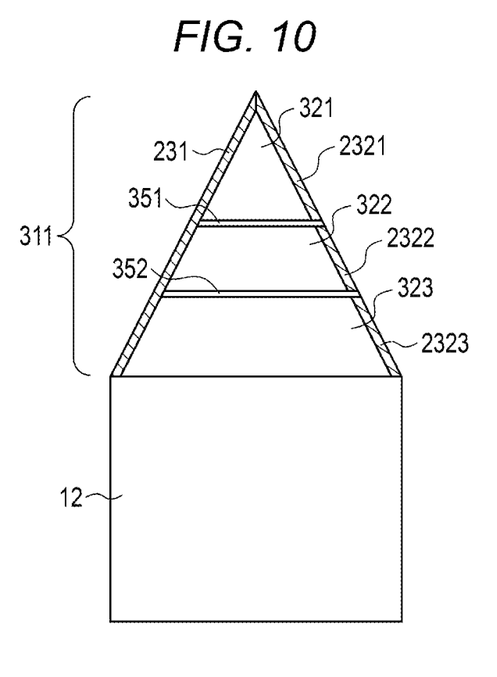
FIG. 10 is a diagram illustrating a second configuration example of the translucent heater.

FIG. 10 is a diagram illustrating a second configuration example of a translucent heater 311 mounted on the decolorizing apparatus 201 according to the second embodiment.

Similar to the translucent heater 11, the translucent heater 311 has a structure in which a translucent substrate, a translucent film, electrodes, and an insulating layer are stacked. However, the translucent heater 311 is different from the translucent heater 11 illustrated in FIG. 3 in the configurations of the translucent film and the electrodes. Similar to the translucent substrate 21 illustrated in FIG. 3, the translucent substrate 21 of the translucent heater 311 may be configured with a translucent member such as a glass substrate or a PET film. However, the translucent substrate 21 of the translucent heater 311 has a different shape from the translucent substrate 21 illustrated in FIG. 3.

In the configuration example illustrated in FIG. 10, the translucent heater 311 is formed with three different-shaped translucent films 321, 322, and 323, which serve as heat sources. The three translucent films 321, 322, and 323 have a shape of an acute-angled corner in a state of being disposed on the translucent substrate 21. The translucent substrate 21 of the translucent heater 311 has a shape that matches the shape in which the three translucent films 321, 322, and 323 are disposed in combination.

The translucent film 321 makes up the shape of the acute-angled corner. The translucent film 321 is disposed in the first region on the translucent substrate 21. The translucent film 322 is disposed on the translucent substrate 21 in combination with the translucent film 321 with the acute-angled corner of the translucent film 321 left. The translucent film 321 and the translucent film 322 are disposed in the second region on the translucent substrate 21. The translucent film 323 is disposed on the translucent substrate 21 in combination with the translucent film 321 and the translucent film 322 with the acute-angled corner of the translucent film 321 left. The translucent film 321, the translucent film 322, and the translucent film 323 are disposed so as to cover the entire decolorizing surface (third region) on the translucent substrate 21.

Each of the translucent films 321, 322, and 323 is covered with the translucent insulating layer 24 in a state of being connected to a pair of electrodes. The translucent film 321 is connected to the electrode 231 and the electrode 2321. The translucent film 322 is connected to the electrode 231 and the electrode 2322. The translucent film 323 is connected to the electrode 231 and the electrode 2323.

The electrodes 231, 2321, 2322, and 2323 connected to the translucent films 321, 322, and 323 are connected to the controller 30 built in the support column 12. The controller 30 may have the same configuration as that of the decolorizing apparatus 1as illustrated in FIG. 5. The electrodes 231, 2321, 2322, and 2323 are connected to the sensor circuit 34 in the controller 30. Here, the electrode 231 is grounded.

The electrode 2321 is connected to the controller 30 in a state of being insulated from the translucent film 322 and the translucent film 323. For example, a wiring connecting the electrode 2321 and the controller 30 is insulated from the translucent film 322 and the translucent film 323 by an insulating layer. The electrode 2322 is connected to the controller 30 in a state of being insulated from the translucent film 323. For example, a wiring connecting the electrode 2322 and the controller 30 is insulated from the translucent film 323 by an insulating layer.

In the translucent heater 311, when an electric potential is applied to the electrode 2321 (when a voltage is applied to the electrode 231 and the electrode 2321), a current flows through the translucent film 321, and heat due to sheet resistance is generated. The sensor circuit 34 of the controller 30 causes the translucent film 321 to generate heat by applying a voltage to the electrodes 231 and 2321 (applying a voltage to the translucent film 321). Therefore, when the sensor circuit 34 applies the voltage to the translucent film 321, the region (first region) in the translucent substrate 21 corresponding to the translucent film 321 is heated by heat from the translucent film 321. The first region of the translucent substrate 21 becomes a region where the thermochromic colorant can be decolorized when the decolorizing temperature is reached by the heat from the translucent film 321.

In the translucent heater 311 when an electric potential is applied to the electrodes 2322 (when a voltage is applied to the electrode 231 and the electrode 2322), a current flows through the translucent film 322, and heat due to sheet resistance is generated. The sensor circuit 34 causes the translucent film 322 to generate heat by applying a voltage to the electrode 231 and electrode 2322 (applying a voltage to the translucent film 322).

The translucent film 322 and the translucent film 321 form a rectangular region (second region) larger than the first region. When the sensor circuit 34 applies a voltage to the translucent film 322 and the translucent film 321, the second region in the translucent substrate 21 corresponding to the translucent film 321 and the translucent film 322 is heated. The second region of the translucent substrate 21 becomes a region where the thermochromic colorant can be decolorized when the decolorizing temperature is reached by the heat from the translucent film 321 and the translucent film 322.

In the translucent heater 311, when an electric potential is applied to the electrode 2323 (when a voltage is applied to the electrode 231 and the electrode 2323), a current flows through the translucent film 323, and heat due to sheet resistance is generated. The sensor circuit 34 causes the translucent film 323 to generate heat by applying a voltage to the electrode 231 and electrode 2323 (applying a voltage to the translucent film 323).

The translucent film 323, the translucent film 322, and the translucent film 321 form a rectangular region (third region) that covers the entire decolorizing surface of the translucent substrate 21. Therefore, when the sensor circuit 34 applies a voltage to the translucent film 323, the translucent film 322, and the translucent film 321, the entire decolorizing surface (third region) of the translucent substrate 21 is heated. The third region of the translucent substrate 21 becomes a region where the thermochromic colorant can be decolorized when the decolorizing temperature is reached by the heat from the translucent film 321, the translucent film 322, and the translucent film 323.

On the translucent heater 311, a mark 351 indicating the region (first region) corresponding to the translucent film 321 and a mark 352 indicating the region (second region) corresponding to the translucent film 321, and the translucent film 322 are displayed. The marks 351 and 352 may be marked in any manner so long as a region to be heated (decolorable region) can be checked by the user. For example, the marks 351 and 352 may be printed on the translucent substrate 21 or may be printed on the insulating layer 24.

Similar to the translucent heater 211 as the first configuration example, the translucent heater 311 as the second configuration example is mounted on the decolorizing apparatus 201 according to the second embodiment. For example, the translucent heater 311 may be mounted in replacement of the translucent heater 211 in the decolorizing apparatus 201 illustrated in FIG. 9. The decolorizing apparatus 201 having the translucent heater 311 mounted thereon can operate in the same manner as the above-described decolorizing apparatus 201 having the translucent heater 211 mounted thereon.

As described above, the decolorizing apparatus according to the second embodiment includes a translucent heater composed of a translucent member and a controller. The translucent heater includes a translucent substrate and a plurality of conductive translucent films. The controller applies a voltage to the translucent film corresponding to a designated region. In the translucent substrate of the translucent heater, the region corresponding to the translucent film to which the voltage is applied is heated, and the thermochromic colorant can be decolorized in the heated region.

In the decolorizing apparatus according to the second embodiment as described above, not only the user can directly and visually recognize the portion pressed by the translucent heater, but also the user can designate a region that can be decolorized. In the decolorizing apparatus according to the second embodiment, the user can designate the size of the region that can be decolorized and can operate the decolorizing apparatus while directly checking the portion corresponding to the designated region. As a result, it is possible to provide a decolorizing apparatus that allows the user to designate the size of the region that can be decolorized according to the portion desired to be decolorized and allows the user to operate while checking the portion that corresponds to the designated region.

The decolorizing apparatus according to the second embodiment is configured so that each region formed by a combination of the plurality of translucent films includes a corner that can be pressed against the recording medium accurately. With this configuration, it is possible to provide a decolorizing apparatus that easily decolorizes the thermochromic colorant on the recording medium accurately regardless of which region the user designates as the region that can be decolorized.

The decolorizing apparatus according to the second embodiment is provided with a mark indicating each region formed by a combination of a plurality of translucent films in the translucent heater. With this configuration, it is possible to provide a decolorizing apparatus that allows the user to easily and visually recognize a region designated as a decolorable region.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A decolorizing apparatus comprising:
   a translucent heater configured to generate heat according to an applied voltage;
   a casing configured to support the translucent heater;
   a controller configured to apply a voltage to the translucent heater, the voltage associated with a temperature at which a thermochromic colorant; and
   a temperature switch configured to designate a target temperature;
   wherein the controller is configured to select the voltage based on the target temperature.

2. The decolorizing apparatus of claim 1, wherein the translucent heater includes a translucent film which generates heat according to the voltage, and a translucent substrate on which the translucent film is supported.

3. The decolorizing apparatus of claim 2, wherein:
the translucent film includes a plurality of film regions, and
the controller is configured to apply the voltage to the plurality of film regions respectively.

4. The decolorizing apparatus of claim 3, wherein:
the plurality of film regions includes a first film region and a second film region, and
the second film region is larger than the first film region.

5. The decolorizing apparatus of claim 4, wherein:
the first film region is shaped as a rectangular;
the second film region is L-shaped; and
the first film region is adjacent the second film region.

6. The decolorizing apparatus of claim 4, wherein:
the first film region is shaped as a first isosceles trapezoid;
the second film region is shaped as a second isosceles trapezoid; and
the first film region is adjacent the second film region.

7. The decolorizing apparatus of claim 2, wherein
the translucent heater is configured to take a decolorization position and other position, and
the controller is configured to:
determine the position of the translucent heater; and
apply the voltage after determining that the translucent heater is in the decolorization position.

8. The decolorizing apparatus of claim 2, further comprising a first electrode positioned on the translucent film and separated from the translucent substrate by the translucent film.

9. The decolorizing apparatus of claim 8, further comprising a second electrode positioned on the translucent film such that a portion of the translucent film extends between the second electrode and the first electrode, the second electrode separated from the translucent substrate by the translucent film;
wherein the translucent film is configured to generate heat due to a current flow between the first electrode and the second electrode.

10. A decolorizing apparatus comprising:
a translucent heater configured to generate heat according to an applied voltage;
a casing configured to support the translucent heater; and
a controller configured to apply a voltage to the translucent heater, the voltage associated with a temperature at which a thermochromic colorant;
wherein the translucent heater includes a translucent film which generates heat according to the voltage, and a translucent substrate on which the translucent film is supported.

11. The decolorizing apparatus of claim 10, wherein:
the translucent film includes a plurality of film regions, and
the controller is configured to apply the voltage to the plurality of film regions respectively.

12. The decolorizing apparatus of claim 11, wherein:
the plurality of film regions includes a first film region and a second film region, and
the second film region is larger than the first film region.

13. The decolorizing apparatus of claim 12, wherein:
the first film region is shaped as a rectangular;
the second film region is L-shaped; and
the first film region is adjacent the second film region.

14. The decolorizing apparatus of claim 12, wherein:
the first film region is shaped as a first isosceles trapezoid;
the second film region is shaped as a second isosceles trapezoid; and
the first film region is adjacent the second film region.

15. The decolorizing apparatus of claim 10, wherein
the translucent heater is configured to take a decolorization position and other position, and
the controller is configured to:
determine the position of the translucent heater; and
apply the voltage after determining that the translucent heater is in the decolorization position.

16. The decolorizing apparatus of claim 10, further comprising a first electrode positioned on the translucent film and separated from the translucent substrate by the translucent film.

17. The decolorizing apparatus of claim 16, further comprising a second electrode positioned on the translucent film such that a portion of the translucent film extends between the second electrode and the first electrode, the second electrode separated from the translucent substrate by the translucent film;
wherein the translucent film is configured to generate heat due to a current flow between the first electrode and the second electrode.

* * * * *